US007856950B2

(12) United States Patent
Kuzuoka et al.

(10) Patent No.: US 7,856,950 B2
(45) Date of Patent: Dec. 28, 2010

(54) ETHANOL FUEL REFORMING SYSTEM FOR INTERNAL COMBUSTION ENGINES

(75) Inventors: Kohei Kuzuoka, Wako (JP); Junichi Kamio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 376 days.

(21) Appl. No.: 12/149,904

(22) Filed: May 9, 2008

(65) Prior Publication Data

US 2008/0282998 A1 Nov. 20, 2008

(30) Foreign Application Priority Data

May 17, 2007 (JP) ............................ 2007-131776

(51) Int. Cl.
*B01J 8/04* (2006.01)

(52) U.S. Cl. .......................... 123/3; 123/1 A; 123/304; 123/557; 123/558; 60/295; 60/282; 60/299; 60/300; 60/320

(58) Field of Classification Search ................ 123/1 A, 123/3, 575, 557, 558, 304, 543, 553, 406.31, 123/568.15; 60/295, 282, 299, 300, 320; 423/DIG. 3, 652; 422/198, 211; 165/104.11, 165/104.31

See application file for complete search history.

(56) References Cited

U.S. PATENT DOCUMENTS 3,918,412 A * 11/1975 Lindstrom .................... 123/3
4,046,522 A * 9/1977 Chen et al. ............... 48/102 A
4,385,593 A * 5/1983 Brooks ....................... 123/1 A
4,444,158 A * 4/1984 Yoon .......................... 123/1 A
4,509,464 A * 4/1985 Hansen ....................... 123/1 A
4,716,859 A * 1/1988 Konig et al. .................. 123/3
4,876,989 A * 10/1989 Karpuk et al. ................ 123/3
5,097,803 A * 3/1992 Galvin ......................... 123/3
6,340,003 B1 * 1/2002 Schoubye et al. ............. 123/3
6,668,763 B2 * 12/2003 Anderson et al. ............. 123/3
7,661,414 B2 * 2/2010 Kamio ........................ 123/557
2005/0115226 A1 * 6/2005 Benz et al. .................... 60/287
2008/0257301 A1 * 10/2008 Hotta et al. ................ 123/253

FOREIGN PATENT DOCUMENTS

JP 405180105 A * 7/1993
JP 2006-226172 A 8/2006

* cited by examiner

*Primary Examiner*—Michael Cuff
*Assistant Examiner*—Hung Q Nguyen
(74) *Attorney, Agent, or Firm*—Birch, Stewart, Kolasch & Birch, LLP

(57) ABSTRACT

An ethanol fuel reforming system for internal combustion engines performs a reaction of reforming ethanol into diethyl ether at a constant temperature with stability. The system has a reformer for containing a reforming catalyst, a first heat exchanger for heating a heating medium with the exhaust gas of an internal combustion engine, a second heat exchanger for heating an ethanol fuel with the heating medium, and heating medium circulating means for circulating the heating medium. The heating medium makes distribution of temperature in the reformer uniform. The heating medium heats the reformer and the ethanol fuel to an identical temperature. The reformer is an ethanol fuel channel filled with the catalyst, and the ethanol fuel channel is bent in the reformer.

11 Claims, 1 Drawing Sheet

ETHANOL FUEL REFORMING SYSTEM FOR INTERNAL COMBUSTION ENGINES

BACKGROUND OF THE INVENTION

1. Field of the Invention

The present invention relates to an ethanol fuel reforming system for an internal combustion engine bringing an ethanol fuel used for an internal combustion engine into contact with a catalyst to reform ethanol into diethyl ether.

2. Description of the Related Art

In recent years, in order to reduce the fuel consumption of internal combustion engines per predetermined load and predetermined time, and to reduce the amount of emission matters from internal combustion engines, compression ignition internal combustion engines represented by homogeneous charge compression ignition internal combustion engines have been under review. In the compression ignition internal combustion engine, oxygen containing gas and a compression ignition fuel are introduced into the cylinder and compressed to ignite the fuel spontaneously.

However, as distinct from spark ignition internal combustion engines, the compression ignition internal combustion engines have a difficulty in controlling the ignition timing. In the compression ignition internal combustion engines, use of a fuel with high ignitability tends to cause knocking when a high load is required for the engines, and use of a fuel with low ignitability tends to cause misfire when a low load is required for the engines. Thus the compression ignition internal combustion engines have a problem of having a narrow operating range where the engines can be operated safely.

In order to overcome the problems, there is conventionally known a technique of mixing two fuels of a highly ignitable fuel and a less ignitable fuel and providing the mixed fuel to compression ignition internal combustion engines depending on required load. However, application of the technique makes mounting the compression ignition internal combustion engines on automobiles and the like complex, because the technique requires two fuel tanks and fuel-by-fuel supply.

Then there is investigated that a part of one fuel is reformed to obtain two fuels with different ignitability. Such a fuel to be reformed is, for example, an ethanol fuel such as gasoline containing ethanol. A technique is suggested that ethanol contained in the ethanol fuel is reformed into diethyl ether (see Japanese Patent Laid-Open No. 2006-226172).

Ethanol can be easily reformed into diethyl ether by heating ethanol to about 200° C. with an acid catalyst. The technique uses gasoline containing ethanol as a first fuel and ethanol is reformed into diethyl ether by bringing a part of the first fuel into contact with an acid catalyst contained in a reformer and heating the first fuel and the catalyst.

As a result, gasoline containing diethyl ether as a second fuel is obtained. Diethyl ether has higher ignitability than ethanol, and the first fuel has low ignitability and the second fuel has high ignitability.

The compression ignition internal combustion engines are regarded as having an enlarged operating range where the engines can be operated safely, by increasing the ratio of the first fuel under high load and increasing the ratio of the second fuel under low load in mixing the first fuel with low ignitability and the second fuel with high ignitability and providing the mixed fuel to the engines.

However, there is a disadvantage that the reaction of reforming ethanol into diethyl ether is difficult to maintain with stability because the reaction tends to be influenced by heating temperature.

SUMMARY OF THE INVENTION

To overcome the disadvantage, an object of the present invention is to provide an ethanol fuel reforming system for internal combustion engines with which system ethanol can be reformed into diethyl ether at a constant temperature, and the reaction of reforming ethanol into diethyl ether can be maintained with stability.

To achieve the object, the present invention provides an ethanol fuel reforming system for an internal combustion engine which system brings an ethanol fuel used for the internal combustion engine into contact with a catalyst to reform ethanol into diethyl ether, comprising:

reforming means for containing the catalyst with which ethanol is reformed into diethyl ether;

a first heat exchanger for heat exchanging between exhaust gas of the internal combustion engine and a heating medium to heat the heating medium;

a second heat exchanger for heat exchanging between the heating medium and the ethanol fuel supplied to the reforming means to heat the ethanol fuel; and heating medium circulating means for providing the heating medium from the first heat exchanger, via the second heat exchanger, to the reforming means to heat the reforming means, and subsequently circulating the heating medium from the reforming means to the first heat exchanger.

In the ethanol fuel reforming system for an internal combustion engine according to the present invention, first, a heating medium circulated by the heating medium circulating means is heated in the first heat exchanger by heat exchanging between the heating medium and exhaust gas of the internal combustion engine. Next, the ethanol fuel supplied to the reforming means is heated in the second heat exchanger by heat exchanging between the ethanol fuel and the heating medium heated as mentioned above. Next, the heating medium is provided to the reforming means to heat the reforming means. After that, the heating medium is circulated back to the first heat exchanger.

The exhaust gas of the internal combustion engine has a temperature in the range of 300° C. to 700° C. The temperature is much higher than about 200° C., which is the temperature at which ethanol is reformed into diethyl ether (hereinafter, abbreviated to reforming temperature). Therefore, use of the ethanol fuel reforming system for an internal combustion engine according to the present invention can maintain the ethanol fuel at the reforming temperature by heating the ethanol fuel supplied to the reforming means and the reforming means by using the heating medium heated by heat exchanging between the heating medium and the exhaust gas. Use of the system also can rapidly heat the catalyst contained in the reforming means to the reforming temperature and maintain the catalyst with stability at the reforming temperature.

As a result of maintaining the ethanol fuel and the catalyst at the reforming temperature, use of the ethanol fuel reforming system for an internal combustion engine according to the present invention can maintain the reaction of reforming ethanol into diethyl ether with stability.

The reaction of reforming ethanol into diethyl ether is active in the vicinity of the inlet of the reforming means through which inlet the ethanol fuel is provided to the reforming means, whereas the reaction is not active in the vicinity of the outlet because the absolute amount of reactive ethanol is reduced there. The reaction of reforming ethanol into diethyl ether is an exothermic reaction. Therefore, when the reaction is active in the vicinity of the inlet of the reforming means and not active in the vicinity of the outlet, the reforming means has high temperature in the vicinity of the inlet and low temperature in the vicinity of the outlet.

Then in the ethanol fuel reforming system for an internal combustion engine according to the present invention, the heating medium preferably makes distribution of temperature in the reforming means uniform. By making distribution of temperature in the reforming means uniform, the reaction of reforming ethanol into diethyl ether can be made uniform in the reforming means.

In the ethanol fuel reforming system for an internal combustion engine according to the present invention, the heating medium preferably heats the reforming means and the ethanol fuel supplied to the reforming means to an identical temperature. As a result, the reaction of reforming ethanol into diethyl ether in the reforming means can be controlled with stability and the output of diethyl ether can be increased.

In the ethanol fuel reforming system for an internal combustion engine according to the present invention, it is preferred that the reforming means comprises an ethanol fuel channel filled with the catalyst, and the ethanol fuel channel is bent in the reforming means. The ethanol fuel channel is bent to have large area of contact with the heating medium in the reforming means, facilitating the giving and receiving of heat with the heating medium.

As a result, the temperature difference between the heating medium and the ethanol fuel and the catalyst becomes small and thus the reaction of reforming ethanol into diethyl ether in the reforming means can be controlled easily. The reforming means can also be heated rapidly.

DETAILED DESCRIPTION OF THE PREFERRED EMBODIMENT

Figure 1:
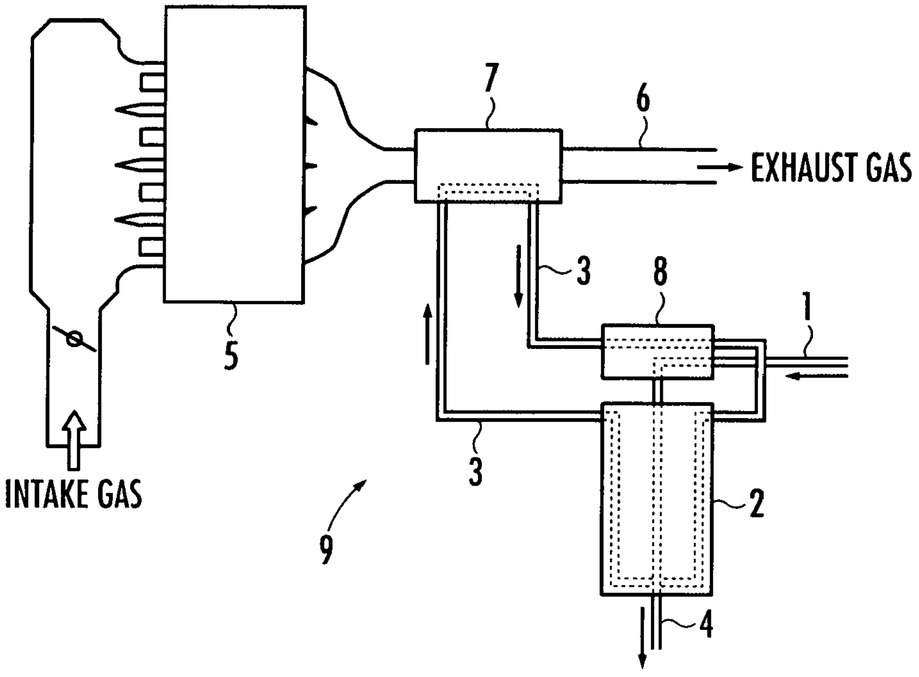
FIG. 1 is a system schematic view showing an embodiment of an ethanol reforming system according to the present invention.

Hereinafter, an embodiment of the present invention is described further in detail with referring to the attached drawings. As shown in FIG. 1, an ethanol fuel reforming system of the present embodiment comprises a feed pipe 1 for providing an ethanol fuel; a reforming reactor 2 to which the ethanol fuel is provided via the feed pipe 1; a heating-medium feeding pipe 3 for providing a heating medium to the reforming reactor 2. The reforming reactor 2 contains a catalyst such as an acid catalyst that reforms ethanol into diethyl ether. At the outlet of the reforming reactor 2, an output pipe 4 is connected for discharging fuel containing diethyl ether.

The heating-medium feeding pipe 3 comprises a first heat exchanger 7 at some midpoint of the pipe 3. The first heat exchanger 7 heats the heating medium by heat exchanging with exhaust gas passing through an exhaust pipe 6 of an internal combustion engine 5. The heating-medium feeding pipe 3 comprises a second heat exchanger 8 in the downstream of the first heat exchanger 7. The second heat exchanger 8 heats the ethanol fuel by heat exchanging between the heating medium and the ethanol fuel passing through the feed pipe 1. The heating-medium feeding pipe 3 comprises the reforming reactor 2 in the downstream of the second heat exchanger 8.

The heating-medium feeding pipe 3 is connected from the downstream of the reforming reactor 2 to the upstream of the first heat exchanger 7. The heating-medium feeding pipe 3 forms heating medium circulating means 9 where the heating medium heated in the first heat exchanger 7 is provided to the second heat exchanger 8 and then to the reforming reactor 2, and back to the first heat exchanger 7.

Figure 2:
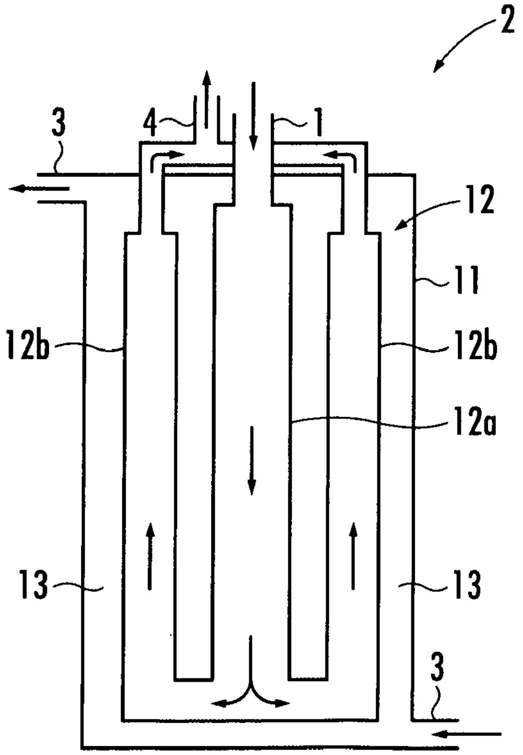
FIG. 2 is an explanatory section view showing the scheme of the reforming reactor shown in FIG. 1.

The reforming reactor 2, as shown in FIG. 2, comprises an ethanol fuel channel 12 through which an ethanol fuel passes in a cylindrical housing 11. The ethanol fuel channel 12 is filled with a catalyst (not shown). The ethanol fuel channel 12 is composed of a main channel 12*a* and a plurality of branched channels 12*b*. The main channel 12*a* is provided in the center of the cylindrical housing 11 along the axis and the upstream of the main channel 12*a* is connected to the feed pipe 1. The branched channels 12*b* are branched radially at the downstream of the main channel 12*a* and provided in the surroundings of the main channel 12*a*. The branched channels 12*b* are mutually assembled and connected to the output pipe 4 on the side where the feed pipe 1 and the main channel 12*a* of the housing 11 are connected.

As a result, the ethanol fuel channel 12 is formed into a bent channel running from the main channel 12*a*, the branched channels 12*b*, and to the output pipe 4.

The gap between the housing 11 and the ethanol fuel channel 12 is a heating-medium channel 13 through which the heating medium passes. The heating-medium channel 13 is connected to the heating-medium feeding pipe 3 at both ends in the axis direction of the housing 11. The heating medium flows into the heating-medium channel 13 from the side where the main channel 12*a* of the ethanol fuel channel 12 bends to branch into a plurality of the branched channels 12*b*. The heating medium flows out of the heating-medium channel 13 from the side where the main channel 12*a* is connected to the feed pipe 1 and the branched channels 12*b* are connected to the output pipe 4.

Hereinafter, the operation of an ethanol fuel reforming system of the present embodiment is described.

Examples of the ethanol fuel may include: gasoline containing ethanol, and an ethanol-water mixture separated by mixing water with gasoline containing ethanol. Use of the ethanol fuel that contains ethanol obtained by fermentation and distillation of vegetable substances, for example, crop such as sugarcane or corn provides the so-called carbon neutral effect. The carbon neutral effect means that the total emission of carbon dioxide is theoretically zero because the vegetable substances themselves absorbed carbon dioxide beforehand, and combustion of ethanol obtained from the vegetable substances emits the same amount of carbon dioxide as the amount of carbon dioxide absorbed in the plants themselves. Therefore, use of the ethanol fuel reduces the amount of emission of carbon dioxide, thereby contributing to preventing global warming.

In the present embodiment, the case of using gasoline containing ethanol as the ethanol fuel is described. In an ethanol fuel reforming system of the present embodiment, when the internal combustion engine 5 starts and the temperature of exhaust gas discharged from the exhaust pipe 6 reaches the range of 300° C. to 700° C., the heating medium is circulated through the heating-medium feeding pipe 3 by using the heating medium circulating means 9. The heating medium circulating means 9 comprises a pump (not shown) at some midpoint of the heating-medium feeding pipe 3. The pump is operated to start the circulation of the heating medium.

The heating medium is not particularly restricted, and, for example, perfluoropolyether may be used. Perfluoropolyether is a fluorine compound and incombustible, thus suitably used.

The heating medium is first heated in the first heat exchanger 7 to about 200° C. by heat exchanging with exhaust gas passing through the exhaust pipe 6. Then the heating medium is provided to the reforming reactor 2 via the second heat exchanger 8.

The ethanol fuel channel 12 of the reforming reactor 2 is filled with a catalyst that reforms ethanol into diethyl ether. As the catalyst, zeolite is preferably used. Also, activated alumina, heteropoly acid, silica alumina, sulfated zirconia, an ion-exchange resin, or the like may be used. Examples of the heteropoly acid may include 12-tungstophosphoric acid. Examples of the ion-exchange resin may include Nafion (registered trademark), and Amberlyst (registered trademark).

The catalyst is cooled when the circulation of the heating medium starts. As mentioned above, the ethanol fuel channel 12 is formed in a bent manner, thereby facilitating the giving and receiving of heat with the heating medium passing through the heating-medium channel 13. The catalyst is thus rapidly heated by the heating medium passing through the heating-medium channel 13, and the catalyst reaches the temperature of about 200° C., which is almost the same temperature as the heating medium. At this time, the heating medium heats the inside of the reforming reactor 2 uniformly.

When the catalyst reaches the temperature of about 200° C., the ethanol fuel is provided from the feed pipe 1 to the reforming reactor 2 to initiate reforming ethanol into diethyl ether. The ethanol fuel provided from the feed pipe 1 is first heated in the second heat exchanger 8 by heat exchanging with the heating medium.

At this time, the flow rate of the heating medium passing through the heating-medium feeding pipe 3 is 800 to 1500 ml/min, for example, 1000 ml/min for the internal combustion engine 5 with a displacement of 2 liters, at 1500 rpm, and under medium to high load. In this case, the flow rate of the ethanol fuel provided from the feed pipe 1 is 1 to 80 ml/min, for example, 50 ml/min. As a result, the flow rate of the heating medium is excessively higher than the flow rate of the ethanol fuel, and thus the ethanol fuel can be heated to about 200° C., which is almost the same temperature as the temperatures of the heating medium and the reforming reactor 2.

The ethanol fuel heated to the above-described temperature is then provided to the reforming reactor 2, bringing the ethanol fuel into contact with the catalyst filled in the ethanol fuel channel 12. At this time, as mentioned above, the reforming reactor 2 and the catalyst are heated uniformly to about 200° C., which is almost the same temperature as the temperature of the heating medium. The temperature is the same as the temperature of the ethanol fuel.

Therefore, the reaction of reforming ethanol contained in the ethanol fuel into diethyl ether can be maintained with stability, and the ethanol is reformed into diethyl ether in the same manner inside the whole reforming reactor 2 heated uniformly. As a result, gasoline containing diethyl ether in high concentration can be obtained continuously from the output pipe 4.

The gasoline containing diethyl ether obtained from the output pipe 4 contains diethyl ether, unreacted ethanol, and small amounts of water produced by the reforming reaction.

What is claimed is:

1. An ethanol fuel reforming system for an internal combustion engine bringing an ethanol fuel used for the internal combustion engine into contact with a catalyst to reform ethanol into diethyl ether, comprising:

reforming means for containing the catalyst with which ethanol is reformed into diethyl ether;

a first heat exchanger for heat exchanging between exhaust gas of the internal combustion engine and a heating medium to heat the heating medium;

a second heat exchanger for heat exchanging between the heating medium and the ethanol fuel supplied to the reforming means to heat the ethanol fuel; and heating medium circulating means for providing the heating medium from the first heat exchanger, via the second heat exchanger, to the reforming means to heat the reforming means, and subsequently circulating the heating medium from the reforming means to the first heat exchanger.

2. The ethanol fuel reforming system for an internal combustion engine according to claim 1, wherein the heating medium makes distribution of temperature in the reforming means uniform.

3. The ethanol fuel reforming system for an internal combustion engine according to claim 1, wherein the heating medium heats the reforming means and the ethanol fuel supplied to the reforming means to an identical temperature.

4. The ethanol fuel reforming system for an internal combustion engine according to claim 1, wherein the reforming means comprises an ethanol fuel channel filled with the catalyst, and the ethanol fuel channel is bent in the reforming means.

5. The ethanol fuel reforming system for an internal combustion engine according to claim 1, wherein the ethanol fuel is gasoline containing ethanol.

6. The ethanol fuel reforming system for an internal combustion engine according to claim 1, wherein the ethanol fuel is an ethanol-water mixture separated by mixing water with gasoline containing ethanol.

7. The ethanol fuel reforming system for an internal combustion engine according to claim 1, wherein the catalyst for reforming ethanol into diethyl ether is one catalyst selected from the group consisting of zeolite, activated alumina, heteropoly acid, silica alumina, sulfated zirconia, and an ion-exchange resin.

8. The ethanol fuel reforming system for an internal combustion engine according to claim 7, wherein the heteropoly acid is 12-tungstophosphoric acid.

9. The ethanol fuel reforming system for an internal combustion engine according to claim 1, wherein the catalyst for reforming ethanol into diethyl ether is zeolite.

10. The ethanol fuel reforming system for an internal combustion engine according to claim 1, wherein the exhaust gas of the internal combustion engine has a temperature in the range of 300° C. to 700° C.

11. The ethanol fuel reforming system for an internal combustion engine according to claim 1, wherein the heating medium is perfluoropolyether.

* * * * *